(12) United States Patent
Zheng et al.

(10) Patent No.: US 10,598,264 B2
(45) Date of Patent: Mar. 24, 2020

(54) BAR MEMBER, ASSEMBLED COMPONENT AND ROBOT

(71) Applicant: ROBOTTIME (BEIJING) TECHNOLOGY CO., LTD., Beijing (CN)

(72) Inventors: Shijie Zheng, Beijing (CN); Hui Liu, Beijing (CN)

(73) Assignee: ROBOTTIME (BEIJING) TECHNOLOGY CO., LTD., Beijing (CN)

( * ) Notice: Subject to any disclaimer, the term of this patent is extended or adjusted under 35 U.S.C. 154(b) by 554 days.

(21) Appl. No.: 15/228,809

(22) Filed: Aug. 4, 2016

(65) Prior Publication Data

US 2017/0036357 A1    Feb. 9, 2017

(30) Foreign Application Priority Data

Aug. 5, 2015   (CN) .......................... 2015 1 0475527
Apr. 20, 2016  (CN) .......................... 2016 1 0248986
Apr. 20, 2016  (CN) .......................... 2016 1 0248987

(51) Int. Cl.
```
G05G 1/00     (2006.01)
F16H 21/00    (2006.01)
F16H 51/00    (2006.01)
B25J 9/08     (2006.01)
A63H 33/12    (2006.01)
```

(52) U.S. Cl.
CPC .............. *F16H 21/00* (2013.01); *A63H 33/12* (2013.01); *B25J 9/08* (2013.01); *F16H 51/00* (2013.01)

(58) Field of Classification Search
CPC ..................................................... A63H 33/12
See application file for complete search history.

(56) References Cited

U.S. PATENT DOCUMENTS 1,045,483 A * 11/1912 Ward ............................ 428/573
1,779,826 A * 10/1930 Potter ..................... A63H 33/06
                                            446/116
(Continued)

FOREIGN PATENT DOCUMENTS

CN    200620007466    8/2007
CN    200720098323    9/2008
(Continued)

*Primary Examiner* — Jake Cook
(74) *Attorney, Agent, or Firm* — Ricky Lam

(57) ABSTRACT

Robot includes an assembled component having a fixed member and a moving member. The moving member includes a multi-hole bar member and a multi-hole circular plate. The multi-hole bar member has a width four times longer than its thickness. The multi-hole bar member includes a set of connecting holes running through the multi-hole bar member along a thickness direction of the multi-hole bar member. The multi-hole circular plate has a central hole and fixed holes distributed around the central hole and arranged circumferentially. The fixed member includes a multi-hole plate and a multi-hole bent plate. The thickness of the multi-hole plate is the same as the thickness of the multi-hole bar member. A bent portion is formed by bending at least one end of the multi-hole bent plate. The fixed holes are arranged in a matrix on the multi-hole plate and distributed on the multi-hole bent plate in a matrix.

8 Claims, 28 Drawing Sheets

(56) References Cited

U.S. PATENT DOCUMENTS

| | | | | |
|---|---|---|---|---|
| 1,789,896 | A * | 1/1931 | Gilbert | A63H 33/042 446/103 |
| 1,792,976 | A * | 2/1931 | Gilbert | A63H 33/042 446/103 |
| 2,542,172 | A * | 2/1951 | Wold | F16L 3/14 248/60 |
| 3,355,837 | A * | 12/1967 | Pedersen | A63H 33/12 403/343 |
| 5,186,672 | A * | 2/1993 | Tung | A63F 9/0098 446/108 |
| 2003/0176142 | A1 * | 9/2003 | Mimlitch, III | A63H 33/042 446/85 |
| 2004/0077256 | A1 * | 4/2004 | Laferrera | A63H 33/12 446/85 |
| 2009/0247045 | A1 * | 10/2009 | Pettey | A63H 33/042 446/484 |

FOREIGN PATENT DOCUMENTS

| | | |
|---|---|---|
| CN | 2009302693550 | 1/2011 |
| CN | 201760079 | 3/2011 |
| CN | 2011203404973 | 6/2012 |
| CN | 201220017712 | 10/2012 |
| CN | 201220361591 | 2/2013 |
| CN | 201310474662 | 1/2014 |
| FR | 2411622 A1 | 7/1979 |
| GB | 867795 A | 5/1981 |
| JP | S5991983 A | 5/1984 |
| JP | 19860080364 U | 12/1987 |
| JP | 19930034863 U | 1/1995 |
| JP | P2002-519606 A | 7/2002 |
| JP | 2007029658 A | 2/2007 |
| JP | 4994531 B2 | 8/2012 |
| JP | 5621063 B1 | 11/2014 |
| JP | 2014201187 A | 11/2014 |
| JP | 2014210187 A | 11/2014 |
| WO | 00/01457 | 1/2000 |
| WO | 00/01457 A1 | 1/2000 |

* cited by examiner

BAR MEMBER, ASSEMBLED COMPONENT AND ROBOT

RELATED APPLICATIONS

The present application claims priority to CN2015104755274 filed Aug. 5, 2015, CN2016102489878 filed Apr. 20, 2016 and CN2016102489863 filed Apr. 20, 2016, each of which is incorporated herein by reference in its entirety.

FIELD OF THE INVENTION

The present invention belongs to the assembled component technology of robots. More particularly, this invention relates to a bar member, an assembled component including the bar member, and a robot including the bar member.

BACKGROUND OF THE INVENTION

With the rapid development of robots, various robots have been developed by the science & technology industries in China and abroad, which provides the necessary material condition for the introduction of robots in all walks of life, such as schools. However, existing robot products are uneven in quality due to wide varieties, and many robots include a lot of parts in order to adapt to the construction of different configurations, so the robots have low applicability and performance-cost ratio, so that a large burden is brought to units and personnel in all walks of life, such as schools, teachers and students.

OBJECTS AND SUMMARY OF THE INVENTION

To overcome the technical problems in the prior art, the present invention provides a bar member. By using the bar member to form an assembled component, the need of conveniently realizing the most variety of movement mechanisms may be satisfied, and the most variety of movement functions may be achieved.

A bar member is provided, wherein the bar member has a width and a thickness, the width of the bar member being four times of the thickness thereof, and connecting holes running through the bar member along a thickness direction of the bar member are provided on the bar member.

Through trial and error, the application has found that, when the ratio of the width to thickness of the bar member is 4:1, the need of conveniently realizing the most variety of movement mechanisms may be satisfied, and the most variety of movement functions may be achieved. The following table shows statistics of lapping convenience with respect to 100 models to be constructed when bar members having different width-to-thickness ratios are used. It can be seen from the table that the ratio of 4:1 is apparently superior to other ratios.

|  | Convenient for lapping | Inconvenient for lapping | Difficult for lapping |
| --- | --- | --- | --- |
| 1:3 | 25 | 35 | 40 |
| 1:4 | 60 | 30 | 10 |
| 1:5 | 30 | 32 | 38 |

Preferably, the connecting holes include connecting holes A and connecting holes B, the aperture of each of the connecting holes A being greater than that of the connecting holes B.

By providing connecting holes A and B of different sizes, when the same connecting members (for example, bolts or screws) are sheathed with shaft sleeves, the relative rotation of connected parts at the connecting through holes may be realized, so that the wear of the connected bar member at these places is reduced while the precision of rotation is ensured. Or, by directly penetrating the connecting members through the smaller connecting holes B, the fixation of the connected bar member is realized.

Further, preferably, a hole center distance between two adjacent connecting holes A, or between two adjacent connecting holes B, or between a connecting hole A and a connecting hole B which are adjacent, is four times of the thickness of the bar member.

By setting the center distance of the holes to be four times of the thickness of the bar member, i.e., to be the same as the width of the bar member, two connected bar members may rotate freely without interference when the bar members are connected through two adjacent holes.

Preferably, a bent portion, which is bent in a plane vertical to the thickness direction of the bent bar member, is provided in the middle or at two ends of the bent bar member.

By bending the middle of the bent bar member in the length direction thereof, the coverage range of the bar member may be expanded, and a bar having a certain bevel is constructed without lapping three straight bar members into a triangle, so that it is greatly convenient to construct a mechanism. Or, after the two ends of the bent bar member are bent, the occurrence of the following problem may be avoided. The problem is that there will be interference between a connected part or connecting member and straight bar members because holes close to the ends are connected to other parts when two straight bar members are hinged at ends, such that the included angle between the two straight bar member cannot be rotated to a very small angle. However, after the bent bar member which is bent at ends is employed, a part or connecting member connected to the middle of two bent bar members has no direct influence on rotating the angle between the two bent bar members to a very small angle because the ends are bent, such that the two bent members may be rotated to a smaller included angle, and the rotation range of the relative included angle between two bar members is expanded.

More preferably, the angle of bending of the bent portion is 135°.

For the bent bar member which is bent at the ends, the angle of bending is set as 135°. Thus, parts connected at the ends may be allowed to have a larger relative movement range while two parts connected to the connecting holes at the ends have a larger angle movement range, and the parts connected at the ends will have no apparent movement interference with parts connected at the second holes from the ends. For the bent bar member which is bent in the middle, it is also possible to have some movement interference between a part connected at the connecting hole of the bent portion and a part connected on one side of the bent portion.

Preferably, the connecting holes further include connecting holes C, an edge of each of the connecting holes C being an enclosed shape formed by successively and sequentially connecting a first line segment, a first semicircular arc, a second line segment and a second semicircular arc, the length of each of the first line segment and the second line segment being four times of the thickness of the bar member, the opening direction of each of the first semicircular arc and the second semicircular arc facing the middle of the connecting holes C, the radius of the first semicircular arc being equal to that of the second semicircular arc.

By providing long holes in a shape of the connecting holes C, through holes of other parts may be allowed to slide in the connecting holes C after passing through the connecting members, so that the constraint of one degree of freedom is provided to the planar movement of other parts. Moreover, by setting the length of each of the first line segment and the second line segment of each of the connecting holes C to be four times of the thickness of the bar member, it may be directly connected to two adjacent connecting holes A or connecting holes B, thereby realizing two-point fixation of a part.

More preferably, the connecting holes further include connecting holes C, an edge of each of the connecting holes C being an enclosed shape formed by successively and sequentially connecting a first line segment, a first semicircular arc, a second line segment and a second semicircular arc, the length of each of the first line segment and the second line segment being four times of the thickness of the bar member, the opening direction of each of the first semicircular arc and the second semicircular arc facing the middle of the connecting holes C, the radius of each of the first semicircular arc and the second semicircular arc being equal to that of the connecting holes A or that of the connecting holes B.

By providing long holes in a shape of the connecting holes C, through holes of other parts may be allowed to slide in the connecting holes C after passing through the connecting members, so that the constraint of one degree of freedom is provided to the planar movement of other parts. Moreover, by setting the length of each of the first line segment and the second line segment of each of the connecting holes C to be four times of the thickness of the bar member, it may be directly connected to two adjacent connecting holes A or connecting holes B, thereby realizing two-point fixation of a part.

Furthermore, preferably, there are the connecting holes B and/or the connecting holes C arranged between two of the connecting holes A.

By providing connecting holes A having a larger aperture on both sides of the connecting holes B and the connecting holes C, the connecting holes A may be allowed to be close to the ends of a connecting bar as far as possible, so as to connect other connecting bars by making the most of the length of the connecting bar, so that it is advantageous to expand the movement range.

More preferably, on the bar member, an outer flange is protruded from a sidewall of the bar member on an outside of the connecting holes A, the thickness of the outer flange being the same as that of the bar member, a distance from an outside edge of the outer flange to the edges of the connecting holes A being a distance from the sidewall of the bar member to the edges of the connecting holes B.

By enlarging the edge of the bar member at a position outside the larger connecting holes A, it is advantageous to ensure the material width of the bar member besides the connecting holes A and thus improve the rigidity and intensity of the bar member. Meanwhile, when the bar member is formed by stamping, it is also advantageous ti improve the manufacturability of processing.

An assembled component is provided, including a moving member and a fixed member, the moving member includes at least one of a multi-hole bar member and a multi-hole circular plate, the multi-hole bar member being the above-described bar member, the multi-hole circular plate having a central hole and a plurality of fixed holes that are distributed around the central hole and arranged circumferentially; and the fixed member includes a multi-hole plate and a multi-hole bent plate, the thickness of the multi-hole plate being the same as that of the multi-hole bar member, and a plurality of fixed holes arranged in a matrix being provided on the multi-hole plate, and a bent portion being formed by bending at least one end of the multi-hole bent plate, and a plurality of fixed holes being distributed on the multi-hole bent plate in a matrix.

By using the above-described bar member to form an assembled component and matching with a fixed member having the same thickness, the size is even, and it is convenient to construct robots, teaching aids or movement mechanisms in various forms to research or verify the feasibility of movement mechanisms. By enlarging models assembled by the assembled component in scale to different degrees, specific movement mechanisms may be formed. When these movement mechanisms are applied in production practices, it is advantageous to shorten the development cycle and quicken the development progress of new products.

Preferably, the assembled component further includes a connecting member for connecting a fixed member and/or a connecting member to a fixed member and/or a connecting member.

By assembling a connecting member together with the assembled component, a connecting member of an appropriate size may be conveniently found by a user, so as to connect the moving member and/or the fixed member, so that a common connecting member is not needed. Taking lapping a robot as example, for example, if a common bolt or screw is selected, the size may be too large; moreover, when in use, if there is interference to the movement of other parts, it is required to saw off the bolt or screw, so that the workload of lapping will be greatly increased, and the usability of the assembled component is reduced. Therefore, the fixed member and the moving member are mated with connecting members of a special size, so it is ensured that a user may conveniently connect the fixed member and the moving member, without selecting and processing existing connecting members.

Embodiment 10

An assembled component is provided, including: a moving member, including: a multi-hole bar member having a ratio of its width to its thickness of 4:1, where, for example, the width of the multi-bole bar is 9.8 mm to 10 mm and the thickness is 2.4 mm to 2.5 mm; and a multi-hole circular plate having a central hole and a plurality of fixed holes distributed on a circumferential surface thereof, where the settings of the width and thickness of the moving member make the moving member realize the lapping of various components; and a fixed member, comprising: a plurality of multi-hole plates, the thickness of each of the plurality of multi-hole plates being the same as that of the multi-hole bar member, a plurality of fixed holes being arranged on the multi-hole plates in a matrix; and, a plurality of multi-hole bent plates, a bent portion being formed by bending at least one end of the multi-hole bent plates, a plurality of fixed holes being distributed on the multi-hole bent plates in a matrix; and the moving member and the fixed member are assembled together through a plurality of connecting members.

Embodiment 11

As a further improvement of the Embodiment 10, the fixed holes include: connecting holes B, which are circular and each have an aperture of 3 mm to 3.2 mm; connecting holes A, which are circular and each have an aperture of 4 mm to 4.2 mm; third fixed holes, which are circular and each have an aperture of 10 mm to 10.2 mm; and connecting holes C, which are strip-shaped and each have an inner diameter length of 13 mm to 13.2 mm or 14 mm to 14.2 mm and an inner diameter width of 3 mm to 3.2 mm or 4 mm to 4.2 mm.

For example, the fixed holes further include square holes for fixing an eccentric wheel. The aperture of each of the square holes is for example 15 mm, and round angles inverted by 2.5 mm are formed at four corners of each of the square holes, respectively. For example, the fixed holes further include circular holes each having an aperture of 15 mm, for fixing a driving eccentric wheel.

Embodiment 12

As a further improvement of the Embodiment 11, the multi-hole bar member includes: at least one first bar member having connecting holes B and connecting holes A distributed thereon at intervals, where, for example, there are three fixed holes on the first bar member, including connecting holes A provided at two ends and a connecting hole B located in the middle, the hole distance between the fixed holes is four times of the thickness thereof, for example, the hole distance being 10 mm in the case of a plate thickness of 2.5 mm, and, of course, there may be a plurality of fixed holes on the first bar member, for example, five, six, seven or more fixed holes; at least one second bar member, two ends of which are provided with connecting holes A, respectively, and also provided with connecting holes C adjacent to the connecting holes A. Usually, strip-shaped connecting holes C capable of adjusting the position of the component are provided on the second bar member.

As a variation, the multi-hole bar member may also be a multi-hole bar member having circular holes each having an aperture of 15 mm to 15.4 mm formed on one end thereof. Of course, the circular holes for fixing the driving wheel may also be provided at any middle position of the multi-hole bar member.

Embodiment 13

As a further improvement of the Embodiments 11 or 12, the multi-hole circular plate includes: at least one first circular plate having a plurality of fixed holes circumferentially arranged on a circumferential surface thereof, wherein connecting holes B and connecting holes C are distributed at intervals; a central hole of the multi-hole circular plate may be for example connected to a driving component to receive the power output of the driving component, and the multi-hole circular plate serves as a driving wheel in the component at this time so as to drive other components integrated therewith to move; and at least one second circular plate having transmission teeth on a circumferential edge thereof. When the circumferential edge of the second circular plate is provided with transmission teeth, the transmission teeth are engaged with a gear to realize the driving function. The formulation way of the fixed holes on the first circular plate may also be as follows: a series of strip-shaped connecting holes C are circumferentially distributed on the circumferential surface close to the circumferential edge, and then a series of connecting holes B or connecting holes A are concentrically distributed around a center. Such a arrangement of the first circular plate may realize that more types of components are connected to the driving wheel, and thus realizes the lapping of more constructions.

Embodiment 14

As a further improvement of the Embodiment 13, the multi-hole plates include: at least one multi-hole square plate having two circular fixed holes formed along a midline of the multi-hole square plate, the pitch of the fixed holes being four times of the thickness thereof; and two groups of connecting holes C are provided on both sides of the two fixed holes, respectively.

Embodiment 15

As a further improvement of the Embodiment 14, the multi-hole bent plates include: at least one first bent member, two ends of which are vertically bent to form bent portions, a plurality of fixed holes being formed on the bent portions, the bent portions on the first bent member each being for example a triangle, an apex angle which is a chamfer, on the top of the triangle, connecting holes A or third fixed holes are formed for matching with other bent members to form a fixed space, which allows a driving component such as a driving motor to be fixed therein; and at least one second bent member, one end of which is vertically bent to form a bent portion, a plurality of fixed holes arranged in parallel being formed on the bent portion. Each end of the second bent member may be a narrow plate having only one single row of fixed holes provided thereon, or may also be a wide plate having a plurality of rows of fixed holes provided thereon. Of source, the second bent member may also be plates, having a single row of fixed holes, which are arranged vertically to each other. The plates are usually used for fixing flexible components. The second bent member particularly has the following bent plate, wherein a bottom plate is a three-hole plate having a width of 9.8 mm to 10 mm. The bent plate is vertical to the bottom plate and arranged corresponding to the middle fixed hole. The second bent member has a wider application range and is suitable for the assembling of various components.

Embodiment 16

As a further improvement of the Embodiment 12, flanges are formed on two sides of the first bar member corresponding to the connecting holes A.

Embodiment 17

As a further improvement of any one of the Embodiments 10 to 16, the assembled component is an assembled component for teaching purpose.

A robot is provided with the assembled component.

By using the above-described bar member to form an assembled component and matching with a fixed member having the same thickness, the size is even, and it is convenient to construct robots, teaching aids or movement mechanisms in various forms to research or verify the feasibility of movement mechanisms. By enlarging models assembled by the assembled component in scale to different degrees, specific movement mechanisms may be formed. When these movement mechanisms are applied in production practices, it is advantageous to shorten the development cycle and quicken the development progress of new products.

Embodiment 19

A robot is provided, including one or more of a power component, a power supply component and a control system component, characterized in that the robot is further provided with the assembled component according to any one of the Embodiments 11 to 18.

Embodiment 20

As a further improvement of the Embodiment 19, the power component, the power supply component or the control system component is provided within an internal space defined by assembling a fixed member and a connecting member.

The power component, the power supply component or the control system component is provided within an internal space defined by assembling a fixed member and a connecting member. The assembled component for teaching purpose provided by the present invention includes a plurality of fixed members, a plurality of moving members and a plurality of connecting members. The connecting members may be for example screws. Every two components may be connected through only one screw. The plurality of fixed members and the plurality of moving members may be assembled through screws to form a plurality of configurations, for example, a mechanical arm, a mechanical paw, a dolly, a multi-legged robot, a shake-like robot or other different robots, thereby realizing rich configurations and strong expansion function. On the basis of the designed size, after all components are adjusted to scale, the assembled component for teaching purpose provided by the present invention still can work normally.

In the assembled component for teaching purpose provided by the present invention, the fixed members may be matched with itself to form supports in any shape. The moving members are usually fixed on supports, and an output end is connected to the moving member. A moving member may also be connected to any moving member and any fixed member to form another type of moving member for performing output work or connecting with other parts. In some cases, a moving member may also be connected to a bent member, and the bent member may be connected to a moving member or a fixed member to form a new transmission member for transmission. In the assembled component for teaching purpose provided by the present invention, based on a plate having a thickness of 2.4 mm to 2.5 mm, holes of different apertures and shapes are provided, thus to enlarge the universality of a component and enlarge the scale of the component to different degrees, so that the assemblies of various configurations may be realized. Some limited variations are made based on the plate, for example, variations of a bent member and a bar member, so that it is possible to assemble and construct robots in various shapes. In use, a user may use few components to realize the design of multiple types of robots, so it is advantageous to improve the effects of design and manufacturing.

DETAILED DESCRIPTION OF THE EMBODIMENTS

The present invention will be described below in detail with reference to the accompanying drawings, such that those skilled in the art can implement the present invention with reference to the text of the description.

Figure 1:
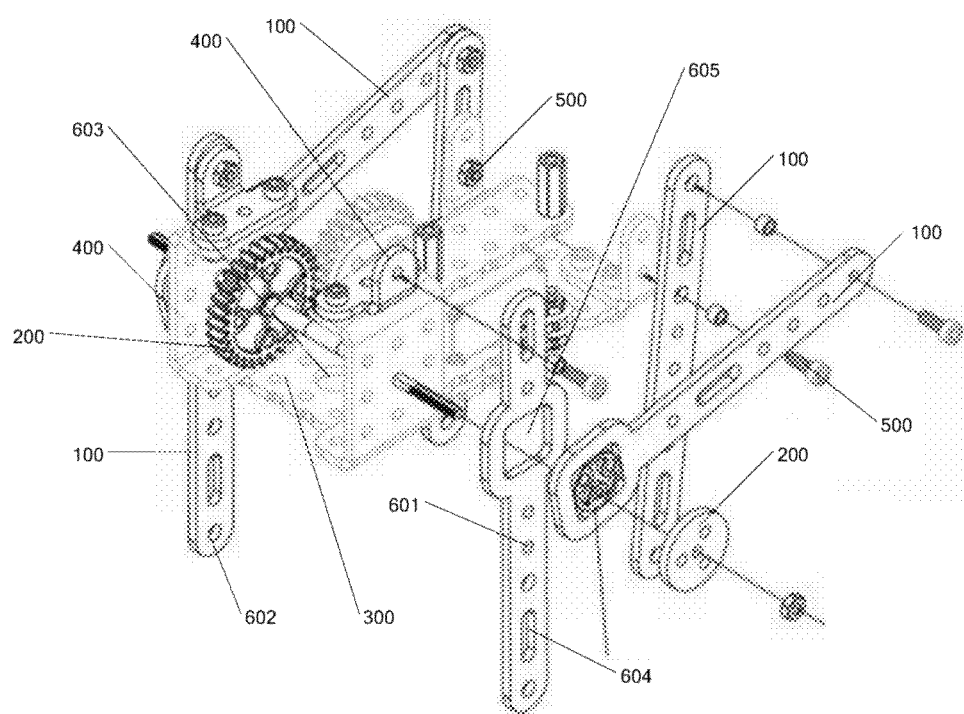
FIG. 1 is a structural diagram of a moving member of an assembled component according to one embodiment of the present invention.

FIG. 1 is an embodiment according to the present invention. An assembled component which includes a moving member. The moving member includes a multi-hole bar member 100 having a width of 9.8 cm to 10 cm and a thickness of 2.4 cm to 2.5 cm. The moving member further includes a multi-hole circular plate 200 having a central hole and a plurality of fixed holes distributed on a circumferential surface thereof. In an embodiment, the moving member includes a fixed member. The fixed member includes a plurality of multi-hole plates 300. The thickness of each of the plurality of multi-hole plates is 2.5 cm. A plurality of fixed holes are arranged on the multi-hole plates in a matrix. In an embodiment, the fixed member includes a plurality of multi-hole bent plates 400. A bent portion is formed by bending at least one end of the multi-hole bent plates. A plurality of fixed holes are distributed on the multi-hole bent plates in a matrix. The moving member and the fixed member are assembled together through a plurality of connecting members 500.

The fixed holes 600 include, for example: connecting holes B 601, which are circular and each have an aperture of 3 mm; connecting holes A 602, which are circular and each have an aperture of 4 mm; third fixed holes 603, which are circular and each have an aperture of 10 mm; and connecting holes C, which are strip-shaped and each have an inner diameter length of 13.2 mm or 14.2 mm and an inner diameter width of 3 mm or 4 mm.

For example, the fixed holes further include, for example, square holes 605 for fixing an eccentric wheel. The aperture of each of the square holes is for example 15 mm, and round angles inverted by 2.5 mm are formed at four corners of each of the square holes, respectively. For example, the fixed holes further include circular holes each having an aperture of 15 mm, for fixing a driving eccentric wheel.

Figure 2:
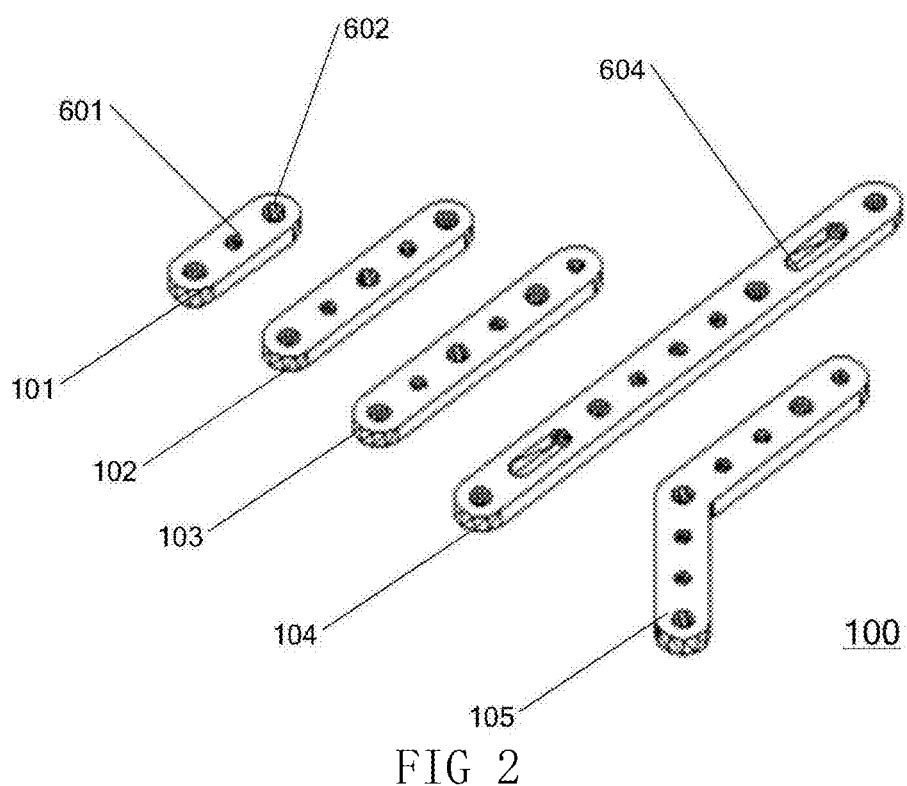
FIG. 2 is a structural diagram of a fixed member of an assembled component according to one embodiment of the present invention.

As shown in FIG. 2, the multi-hole bar member 100 includes, for example, at least one first bar member 101, 102, 103 having connecting holes B 601 and connecting holes A 602 distributed thereon at intervals. As shown in the figure, for example, there are three fixed holes on the first bar member 101, including connecting holes A 602 provided at two ends and a connecting hole B 601 located in the middle, respectively. A hole distance between the fixed holes is for example 10 mm. For example, there are five fixed holes on the first bar member 102, including connecting holes A 602 distributed at two ends, and connecting holes B 601 and connecting holes 602 which are distributed in the middle at intervals. While there are six fixed holes on the first bar member 103, including connecting holes B 601 and connecting holes 602 which are distributed at intervals, there may be a plurality of fixed holes on the first bar member, for example, five, six, seven or more fixed holes.

The multi-hole bar member 100 further includes at least one second bar member 104. Two ends of the second bar member are provided with connecting holes A 601, respectively, and also provided with connecting holes C 604 adjacent to the connecting holes A. Strip-shaped connecting holes 604 capable of adjusting a position of the component are provided on the second bar member 104. Thus, it is convenient to realize walking components or arm components for assembling a robot.

The multi-hole bar member 100 further includes at least one bar member 105. The bar member is, for example, a bent member. An extension line of at least one end of the bar member forms an included angle of, for example, 135° in relation to an axis of a main body. Of course, the third bar member may also have an included angle at two ends. The included angle may be formed at one end of the third bar member, or may also be formed at two ends of the third bar member. The multi-hole bar member may also be deformed to be a multi-hole bar member having circular holes each having an aperture of 15 mm on one end thereof. Of course, the circular holes for fixing the driving wheel may also be provided at any middle position of the multi-hole bar member.

Figure 3:
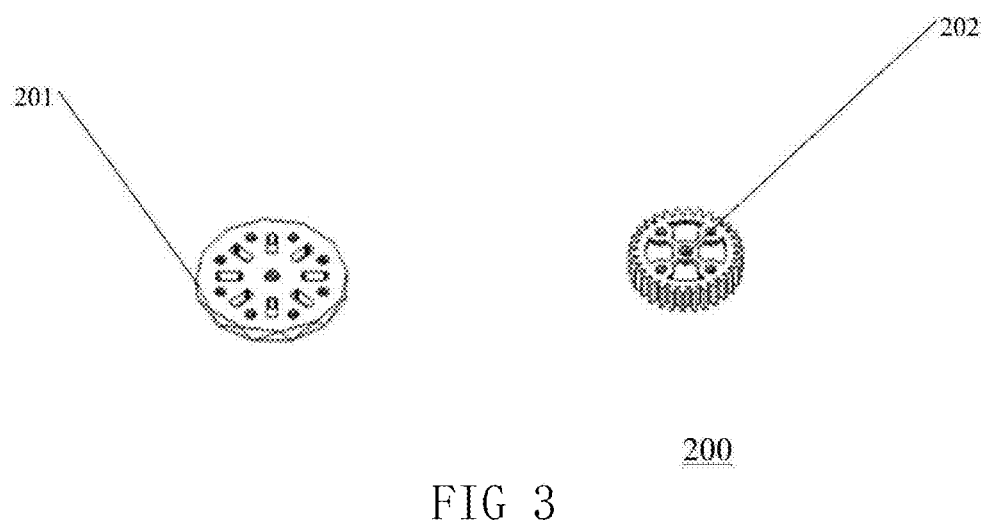
FIG. 3 is a structural diagram of an assembled component according to one embodiment of the present invention.

As shown in FIG. 3, the multi-hole circular plate includes a multi-hole circular plate 201, a central hole of which is a connecting hole A 602. Using the central hole as a center of circle, connecting holes B 601 and connecting holes C 604 which are distributed at intervals are concentrically provided on a circumferential surface of the multi-hole circular plate 201. The multi-hole circular plate further includes a multi-hole circular plate 202 having crawler teeth provided on an outer circumferential edge thereof. The crawler teeth are used for matching with a corresponding multi-hole bar member to realize the function of a driving wheel.

Figure 4:
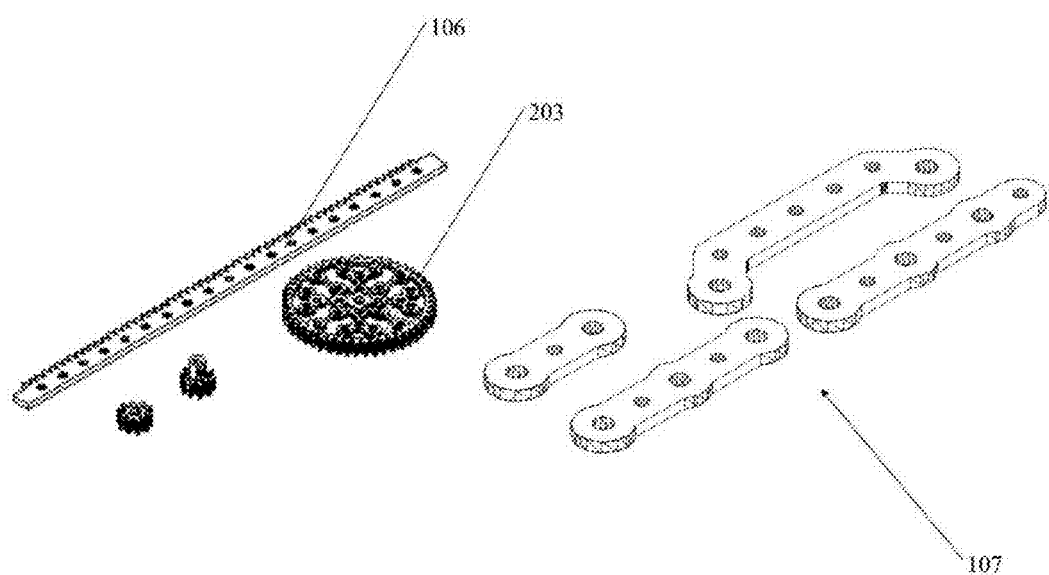
FIG. 4 is a structural diagram of an assembled component according to one embodiment of the present invention.

As shown in FIG. 4, the multi-hole bar member may further include a multi-hole bar member 106 having crawler teeth on a side edge. Connecting holes B 601 are distributed on a plate surface of the multi-hole bar member 106 at equal intervals of for example 10 mm. The multi-hole circular plate may further include a multi-hole circular plate 203 having a plurality of centrically arranged connecting holes B 601 distributed thereon and having crawler teeth provided on an outer circumferential edge thereof. In the multi-hole bar member, peripheries of the connecting holes A may extend outward to form the multi-hole bar member as shown in FIG. 4. The maximum width of the multi-hole bar member 107 does not exceed 10 cm. With such a variation, the manufacture cost may be reduced. More assembling spaces and more assembled constructions may be provided during assembling.

Figure 5:
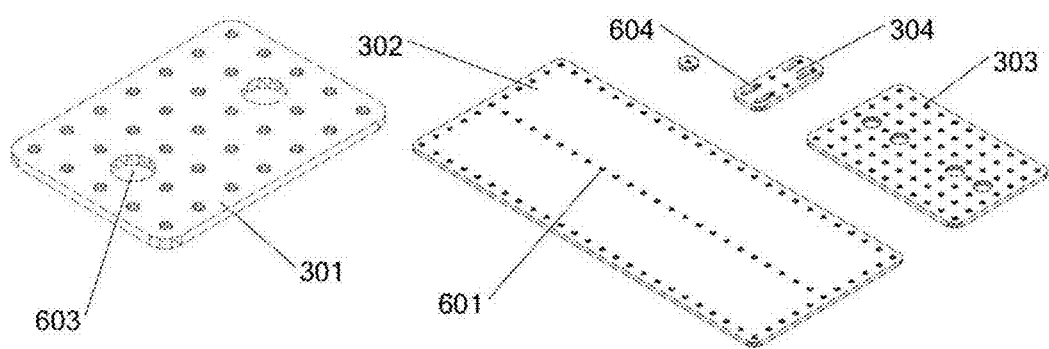
FIG. 5 is a structural diagram of an assembled component according to one embodiment of the present invention.

As shown in FIG. 5, the fixed member in the assembled component provided by the present invention includes a first multi-hole plate 301 and a second multi-hole plate 302. The first multi-hole plate 301 is a rectangular plate having connecting holes B rectangularly arranged on a plate surface thereof. Two of a row of holes along a midline are third fixed holes 603. A hole distance between the fixed holes is 10 mm. The second multi-hole plate 302 is a rectangular plate having connecting holes B 602 peripherally arranged on a plate surface thereof at intervals and also having a series of connecting holes B 601 arranged along a midline at intervals. The first multi-hole plate 301 has, for example, 7 rows of connecting holes B distributed on a plate surface thereof at equal intervals. Four fixed holes of a middle row of fixed holes are third fixed holes 603 for providing the possibility of more types of moving members. A multi-hole square plate 304 has two circular fixed holes such as connecting holes 601 formed along a midline. A hole distance between the fixed holes is 10 mm. Two groups of strip-shaped fixed holes 604 are provided on two sides of the two fixed holes, respectively.

Figure 6:
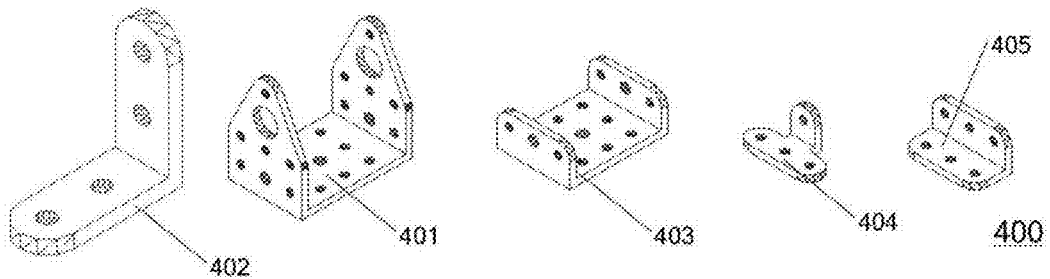
FIG. 6 is a structural diagram of an assembled component according to one embodiment of the present invention.

As shown in FIG. 6, the multi-hole bent plates 400 in the assembled component provided by the present invention include at least one first bent member 401 and at least one second bent member 402. Two ends of the first bend member 401 are vertically bent to form bent portions. A plurality of fixed holes are formed on the bent portions. Each of the bent portions on the first bent member 401 is, for example, a triangle. An apex angle of the triangle is a chamfer. On the top of the triangle, connecting holes A or third fixed holes are formed for matching with other bent members to form a fixed space. The fixed space allows a driving component such as a driving motor to be fixed therein. The second bent member 402 is a bent member bent along a midline. Each of its bent portions has connecting holes B or connecting holes A distributed at equal intervals. For example, a second bent member 403 is bent member vertically bent upward at two ends. Its bent portion has a row of connecting holes B and connecting holes B distributed at equal intervals. For example, a second bent member 404 is a plate member having a width of 10 mm. One of its bent portions has only one fixed hole while another bent portion of it is provided thereon with a row of three connecting holes B distributed at equal intervals. For example, a second bent portion 405 is a plate member having a width of 25 mm. The plate member is folded along a midline and has connecting holes B distributed thereon at intervals. Each end of the second bent member may be a narrow plate having only one single row of fixed holes provided thereon, or may also be a wide plate having a plurality of rows of fixed holes provided thereon. Of source, the second bent member may also be plates having a single row of fixed holes arranged vertically to each other. The plates are usually used for fixing flexible components. The second bent member particularly has the following bent plate. The bottom plate is a three-hole plate having a width of 9.8 mm to 10 mm. The bent plate is vertical to the bottom plate and arranged corresponding to the middle fixed hole. The second bent member has a wider application range and is suitable for the assembling of various components.

Figure 7:
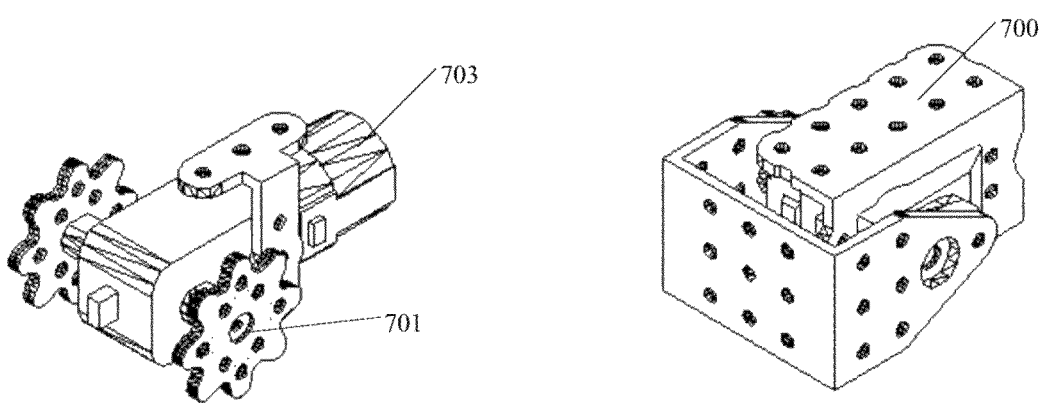
FIG. 7 is a structural diagram of an assembled component according to one embodiment of the present invention.

As shown in FIG. 7, the assembled component provided by the present invention further includes one or more of a power component, a power supply component and a control system component. Where, the power component 703 is provided within an internal space defined by assembling a fixed member 700 and a connecting member 701.

Figure 8:
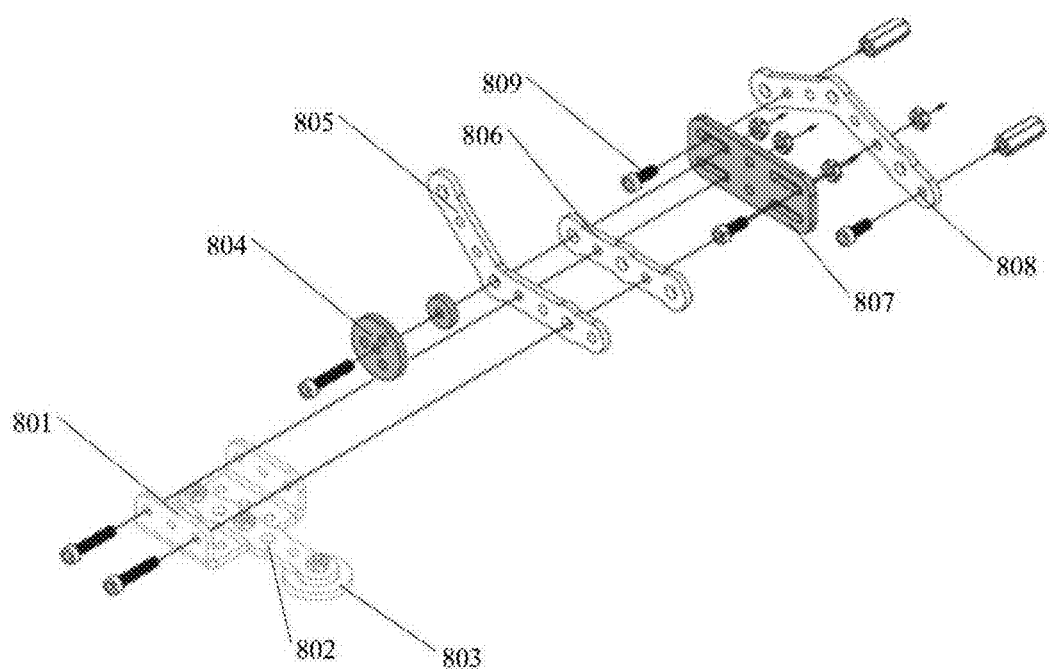
FIG. 8 is a structural diagram of a modular robot assembled by an assembled component according to one embodiment of the present invention.
Figure 9:
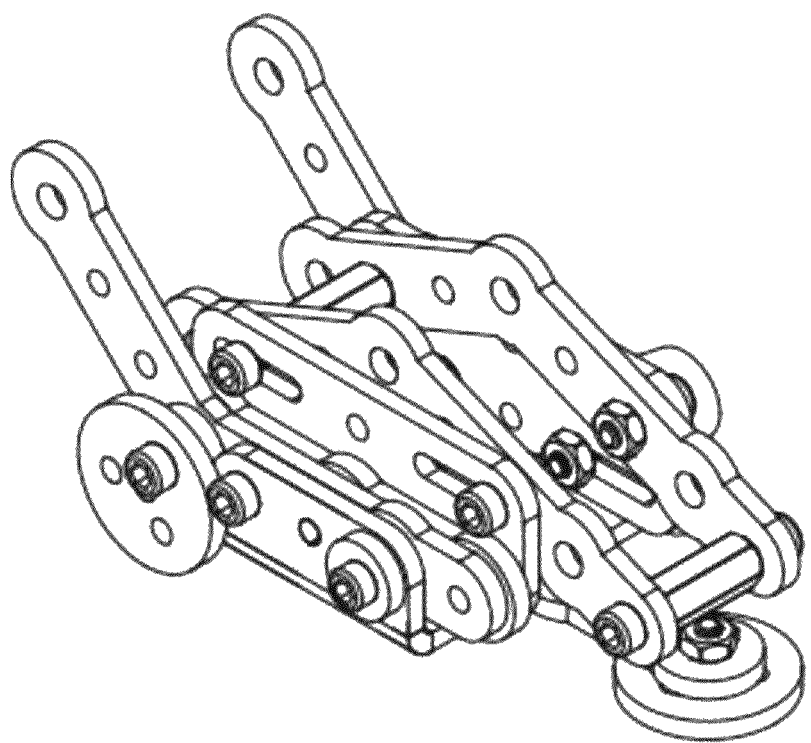
FIG. 9 is a structural diagram of a modular robot assembled by an assembled component according to one embodiment of the present invention.
Figure 10:
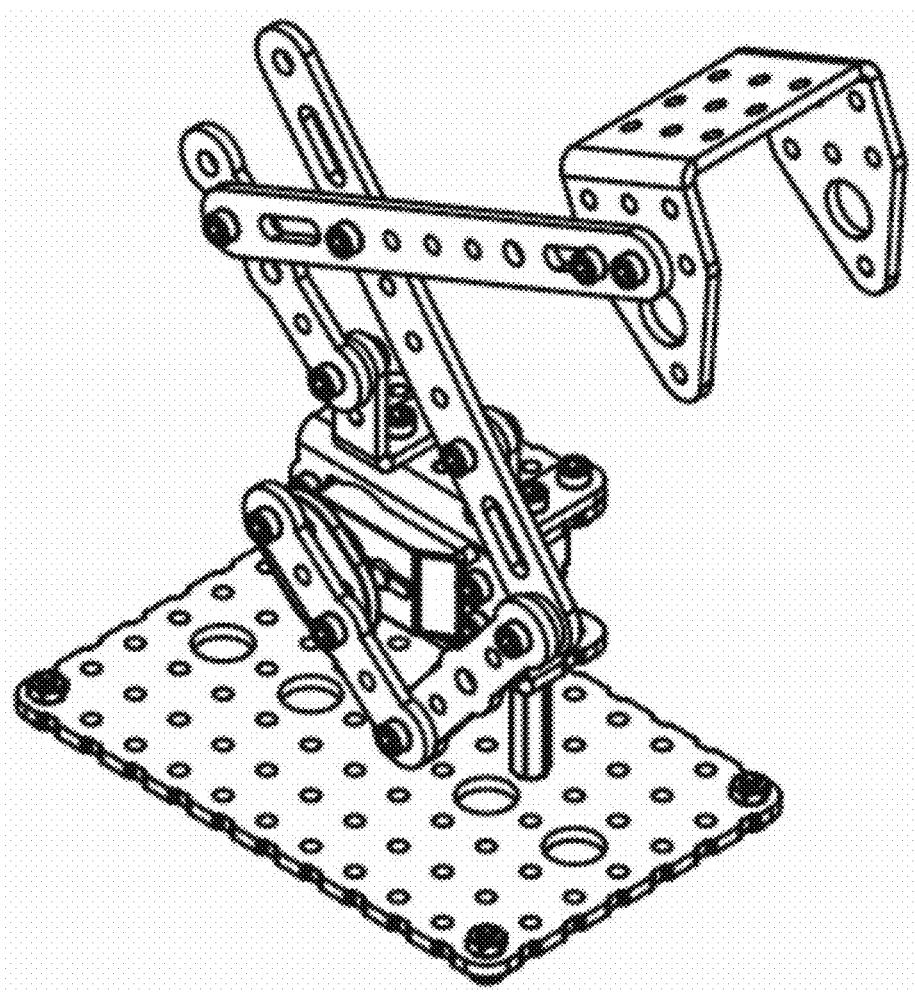
FIG. 10 is a structural diagram of a modular robot assembled by an assembled component according to one embodiment of the present invention.

As shown in FIG. 8, the assembled components provided by the present invention may select a multi-hole bent member 801, a multi-hole bar member 802, multi-hole circular plates 803 and 804, multi-hole bar members 805 and 806, a multi-hole plate 807 and a multiple bar member 808. All of the components are assembled and connected by using connecting members, for example, a plurality of screws 809, to form a modular robot shown in FIG. 9. FIG. 10 shows a modular robot assembled by using the assembled component for teaching purpose provided by the present invention. Of source, more modules may be assembled by using different assembled components for teaching purposes through continuous innovation of a user.

To further understand the summary, features and effects of the present invention, the following embodiments will be helpful.

Embodiment 1

As shown in FIGS. 11-18, a bar member is provided, where the bar member has a width and a thickness. The width of the bar member is four times of the thickness thereof. Connecting holes running through the bar member along a thickness direction of the bar member are provided on the bar member. For example, the width of the bar member may be 9.8 mm to 10 mm. The thickness may be 2.4 mm to 2.5 mm.

Through trial and error, the inventor has found that, when the ratio of the width to thickness of the bar member is 4:1, the need of conveniently realizing the most variety of movement mechanisms may be satisfied. The most variety of movement functions may be achieved.

Specifically, the connecting holes include connecting holes A 602 and connecting holes B 601. The aperture of each of the connecting holes A 602 is greater than that of the connecting holes B 601. For example, the connecting holes A 602 may each have a diameter of 4 mm to 4.2 mm. The connecting holes B 601 may each have a diameter of 3 mm to 3.2 mm. The size of each hole may refer to FIGS. 13 and 14. When in use, the connecting holes B 601 may be connected directly by using bolts 901 or screws of M3 and then screwing nuts 903. Or the bolts 901 or screws of M3 are sheathed with shaft sleeves 902 having a wall thickness of 0.5 mm or 0.4 mm and an outer diameter of 4 mm to realize the connection of the connecting holes A 602, and then nuts 903 are screwed. The bolted connection way may refer to FIGS. 15*a*, 15*b*, 16*a* and 16*b*.

By providing connecting holes A and B 601 of different sizes, when the same connecting members (for example, bolts 901 or screws) are sheathed with shaft sleeves 902, the relative rotation of connected parts at the connecting through holes may be realized, so that the wear of the connected bar member at these places is reduced while the precision of rotation is ensured. Or, by directly penetrating the connecting members through the smaller connecting holes B 601, the fixation of the connected bar member is realized.

Further, specifically, a hole center diameter between two adjacent connecting holes A 602, or between two adjacent connecting holes B 601, or between a connecting hole A 602 and a connecting hole B 601 which are adjacent, can be four times of the thickness of the bar member. The size may refer to FIG. 13.

By setting the center distance of the holes to be four times of the thickness of the bar member (i.e., to be the same as the width of the bar member), two connected bar members may rotate freely without interference when the bar members are connected through two adjacent holes.

Specifically, the connecting holes further include connecting holes C 604. An edge of each of the connecting holes C 604 is an enclosed shape formed by successively and sequentially connecting a first line segment, a first semicircular arc, a second line segment and a second semicircular arc. The length of each of the first line segment and the second line segment is four times of the thickness of the bar member. The opening direction of each of the first semicircular arc and the second semicircular arc faces the middle of the connecting holes C 604. The radius of each of the first semicircular arc and the second semicircular arc is equal to that of the connecting holes A 602 or that of the connecting holes B 601. The connecting holes C 604 may refer to the bar member at the lowest part of FIGS. 11 and 12 and 14. The schematic diagram of the connection of a bar member having the connecting holes C with other parts may refer to FIGS. 17*a* and 17*b*.

By providing long holes in a shape of the connecting holes C 604, through holes of other parts may be allowed to slide in the connecting holes C 604 after passing through the connecting members. The constraint of one degree of freedom is provided to the planar movement of other parts. Moreover, by setting the length of each of the first line segment and the second line segment of each of the connecting holes C 604 to be four times of the thickness of the bar member, it may be directly connected to two adjacent connecting holes A 602 or connecting holes B 601, thereby realizing two-point fixation of a part.

Figure 11:
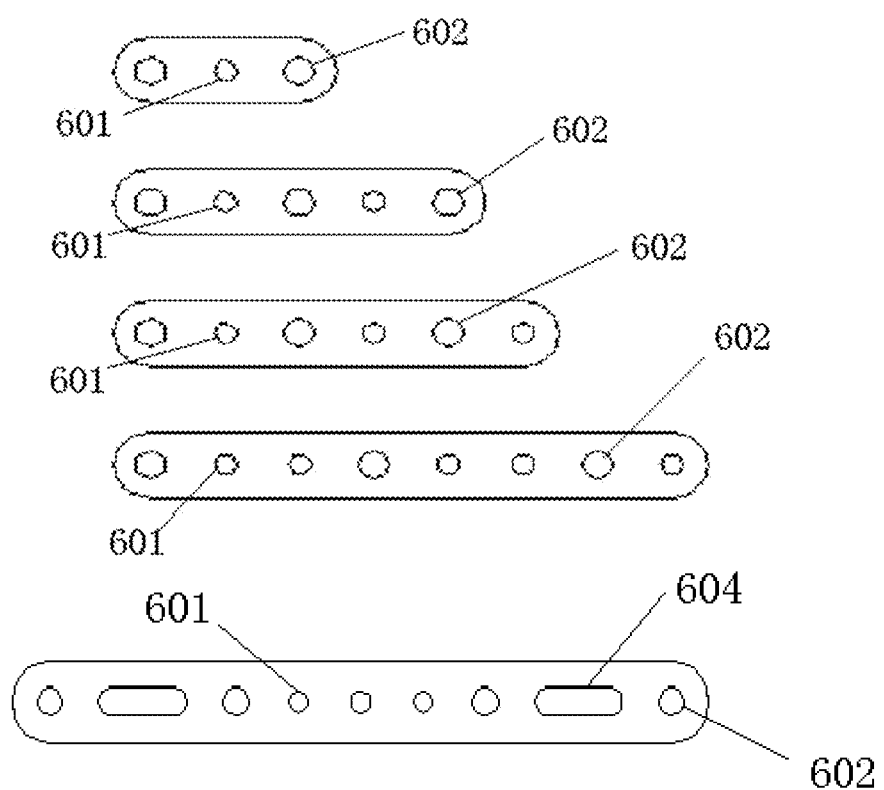
FIG. 11 is a top view of each bar member in Embodiment 1.
Figure 12:
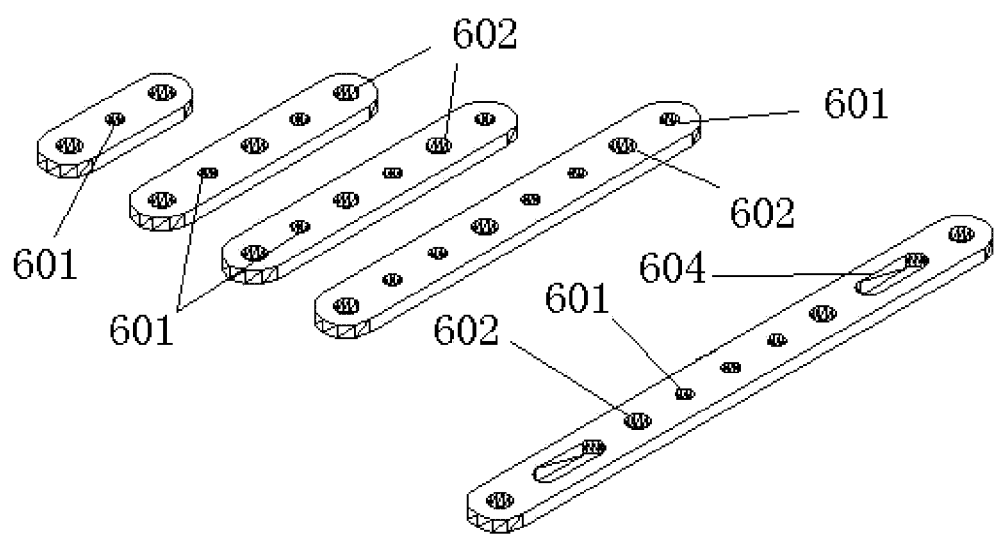
FIG. 12 is a stereoscopic diagram of each bar member in Embodiment 1.
Figure 13:
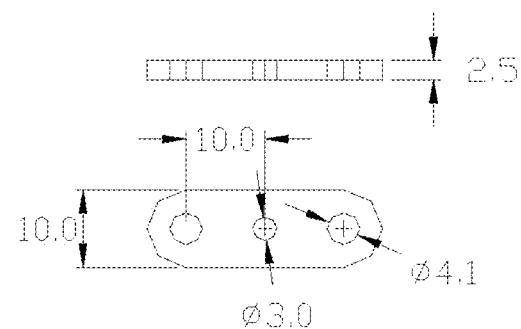
FIG. 13 is a dimensional diagram of a bar member only having two connecting holes A and one connecting hole in Embodiment 1.
Figure 14:
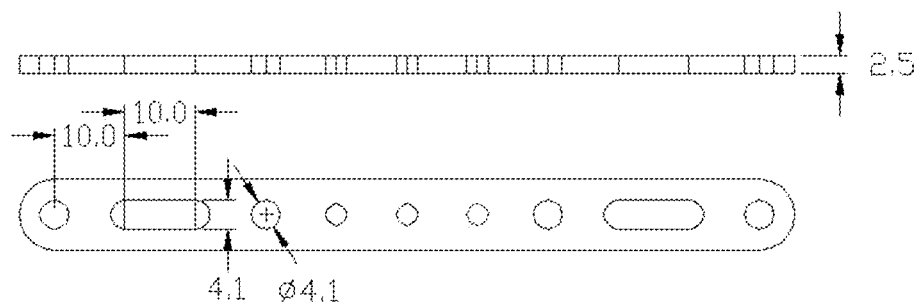
FIG. 14 is a dimensional diagram of a bar member having connecting holes in Embodiment 1.
Figure 15A:
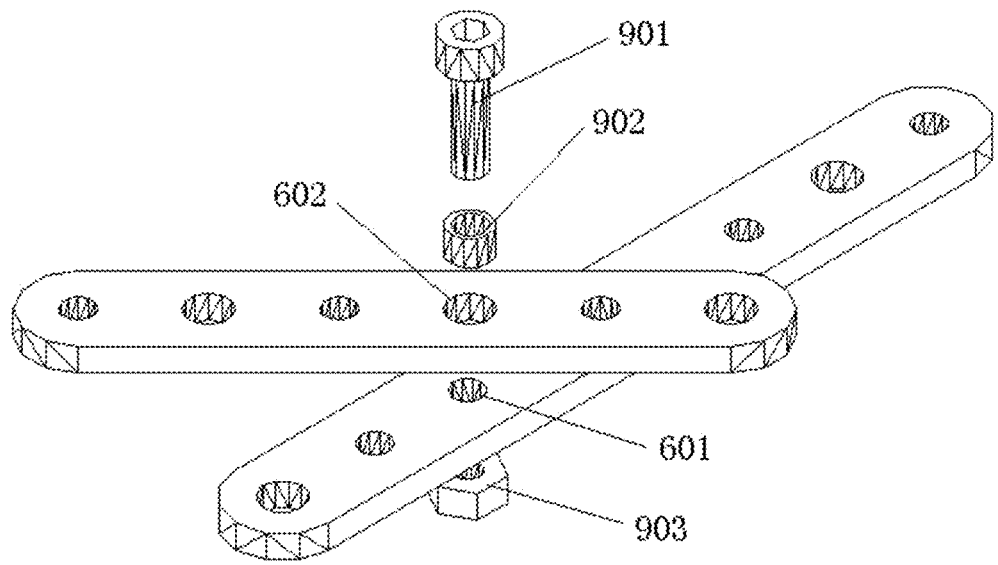
FIGS. 15a and 15b are a stereoscopic exploded view and a stereoscopic diagram of the connection of a connecting hole A and a connecting hole B through a connecting member, respectively.
Figure 15B:
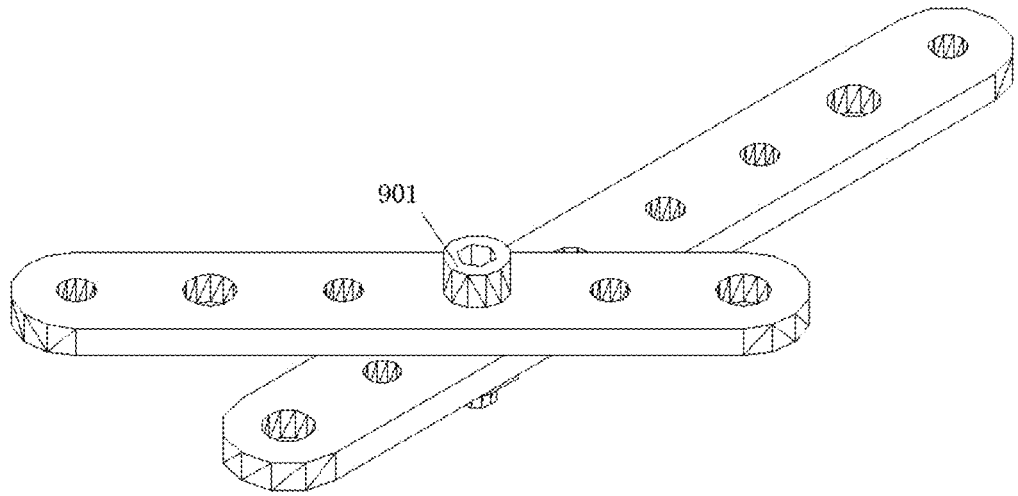
Figure 16A:
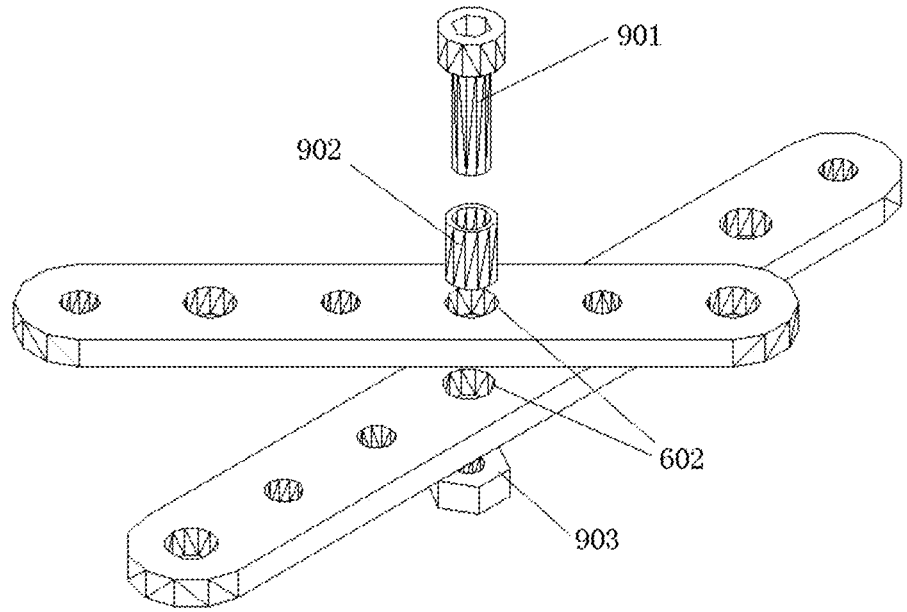
FIGS. 16a and 16b are a stereoscopic exploded view and a stereoscopic diagram of the connection of a connecting hole A and a connecting hole A through a connecting member, respectively.
Figure 16B:
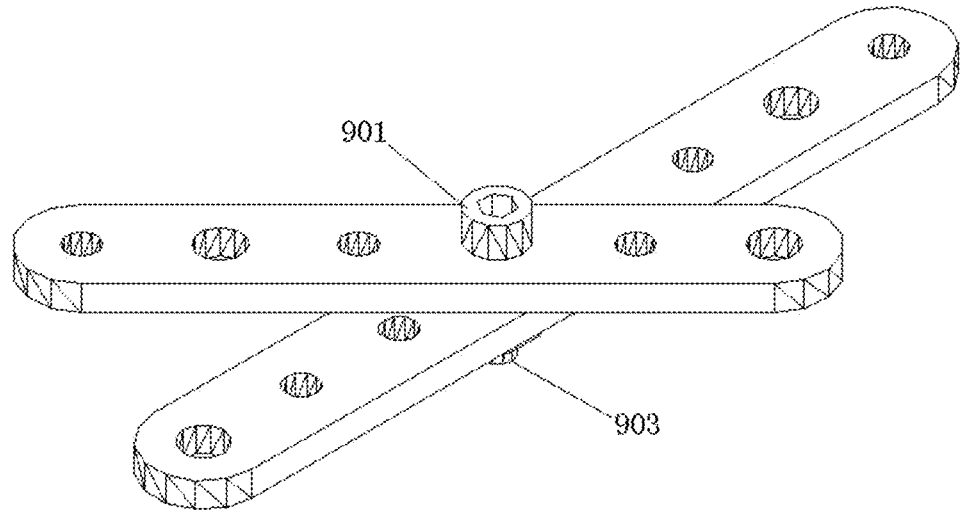
Figure 17A:
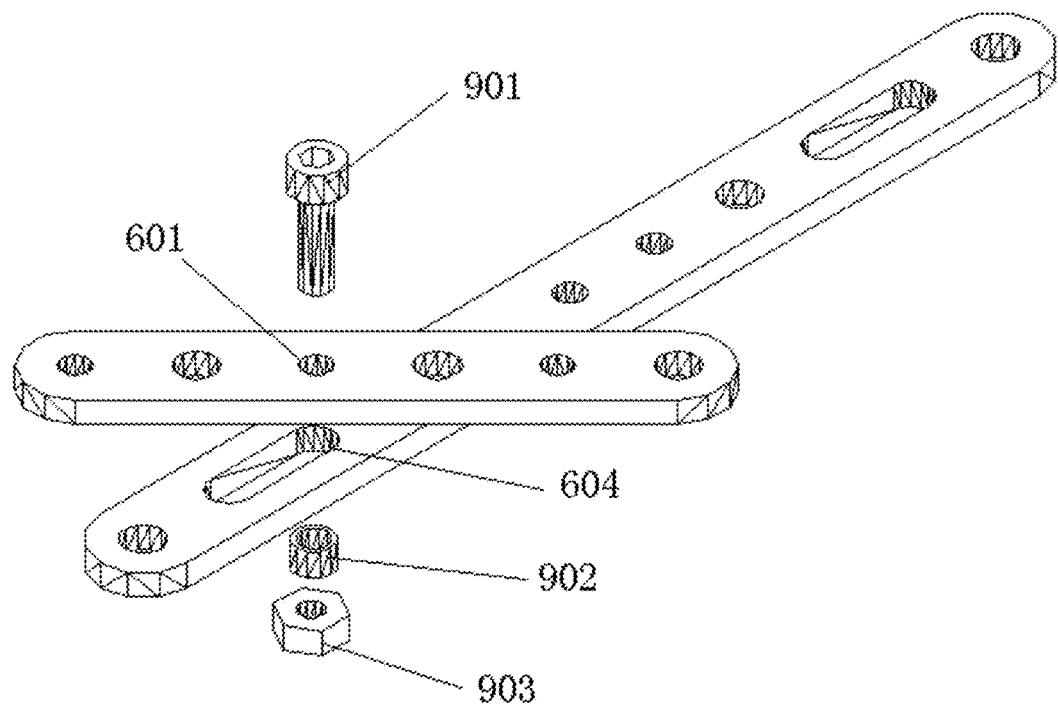
FIGS. 17a and 17b are a stereoscopic exploded view and a stereoscopic diagram of the connection of a connecting hole B and a connecting hole C through a connecting member, respectively.
Figure 17B:
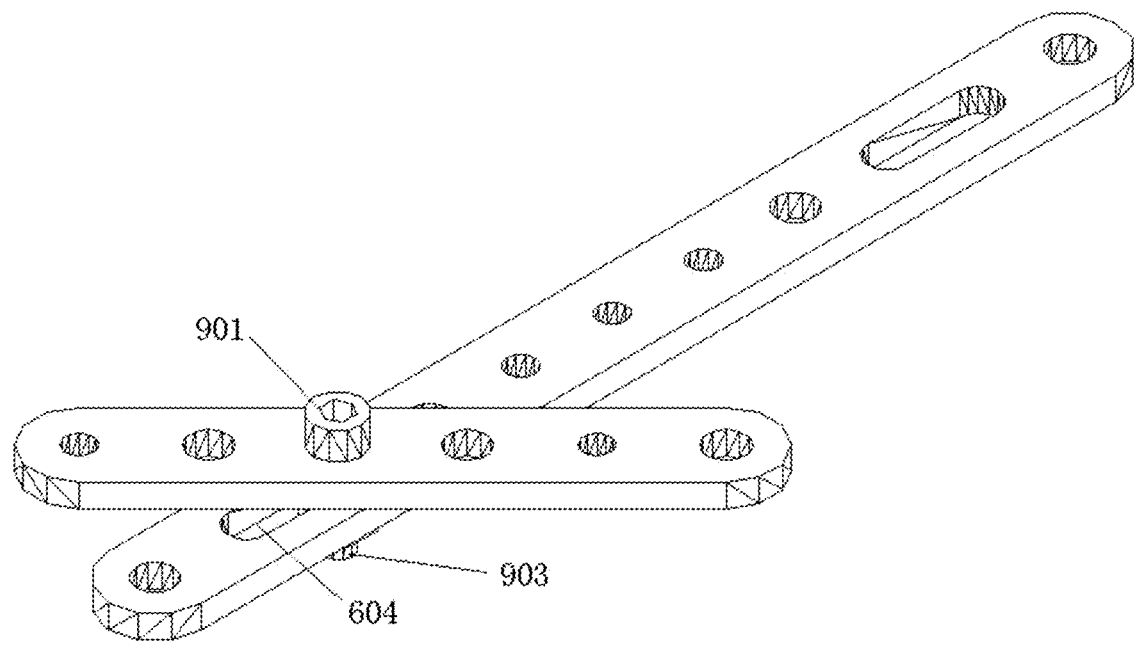
Figure 18:
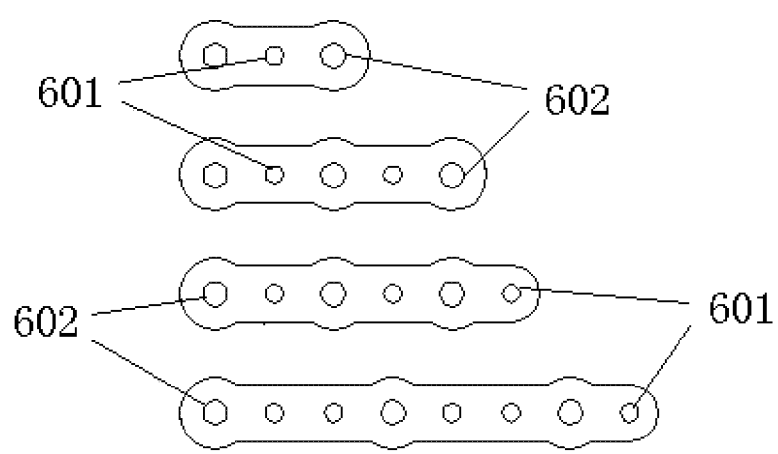
FIG. 18 is a structural diagram of a bar member having a flange provided on a sidewall thereof.

Furthermore, specifically, there are the connecting holes B 601 and/or the connecting holes C 604 arranged between two of the connecting holes A 602. In FIGS. 11 and 12, different arrangement modes of connecting holes A, connecting holes B and connecting holes C on a bar member are illustrated. In FIG. 11, the following arrangement and combination modes of connecting holes are shown from top to bottom. One connecting hole 601 is provided between two connecting holes A 601. One connecting hole B is provided in each of the intervals of three connecting holes A 602. Three pairs of connecting holes are provided from left to right. Each pair of connecting holes from left to right includes one connecting hole 602 and one connecting hole B 601. From left to right: one connecting hole A 602+two connecting holes B 601+one connecting hole A 602+two connecting holes B 601+one connecting hole A 602+one connecting hole B 601. From left to right: one connecting hole A 602+one connecting hole C 604+one connecting hole A 602+three connecting holes B 601+one connecting hole A 602+one connecting hole C 601+one connecting hole A 602.

By providing connecting holes A 602 having a larger aperture on both sides of the connecting holes B and the connecting holes C 604, the connecting holes A 602 may be allowed to be close to the ends of a connecting bar as far as possible. We can connect other connecting bars by making the most of the length of the connecting bar, so that it is advantageous to expand the movement range.

Further, specifically, on the bar member, an outer flange is protruded from a sidewall of the bar member on an outside of the connecting holes A 602. The thickness of the outer flange is the same as that of the bar member. A distance from an outside edge of the outer flange to the edges of the connecting holes A 602 is a distance from the sidewall of the bar member to the edges of the connecting holes B 601.

By enlarging the edge of the bar member at a position outside the larger connecting holes A 602, it is advantageous to ensure the material width of the bar member besides the connecting holes A 602 and thus improve the rigidity and intensity of the bar member. Meanwhile, when the bar member is formed by stamping, it is also advantageous ti improve the manufacturability of processing.

Embodiment 2

Figure 19:
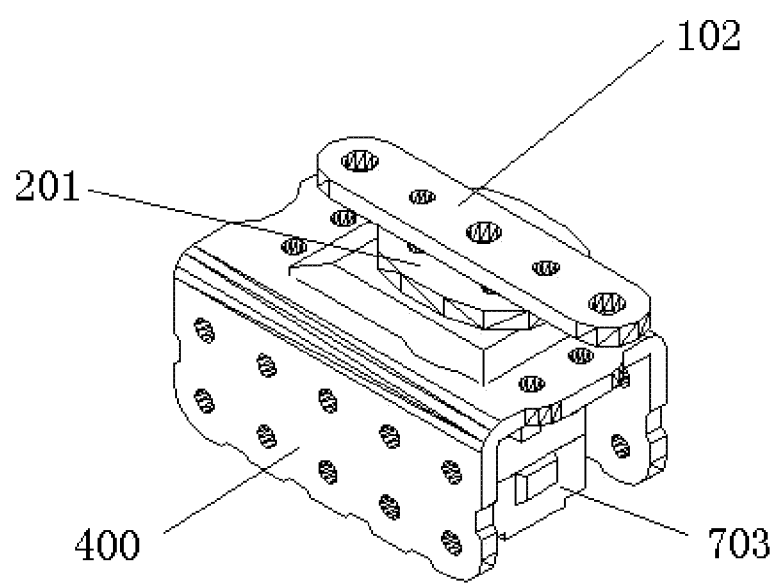
FIG. 19 is a structural diagram of a driving mechanism assembled by an assembled component.

FIG. 19 is a structural diagram of a driving mechanism assembled by using an assembled component.

An assembled component includes a moving member and a fixed member. The moving member includes at least one of a multi-hole bar member and a multi-hole circular plate. The multi-hole bar member is the bar member in the embodiments described above. The multi-hole circular plate has a central hole and a plurality of fixed holes that are distributed around the central hole and arranged circumferentially. The fixed member includes a multi-hole plate and a multi-hole bent plate. The thickness of the multi-hole plate is the same as that of the multi-hole bar member. A plurality of fixed holes are arranged in a matrix provided on the multi-hole plate. A bent portion is formed by bending at least one end of the multi-hole bent plate. A plurality of fixed holes are distributed on the multi-hole bent plate in a matrix.

By using the above-described bar member to form an assembled component and matching with a fixed member having the same thickness, the size is even. Moreover, it is convenient to construct robots, teaching aids or movement mechanisms in various forms to research or verify the feasibility of movement mechanisms. By enlarging models assembled by the assembled component in scale to different degrees, specific movement mechanisms may be formed. When these movement mechanisms are applied in production practices, it is advantageous to shorten the development cycle and quicken the development progress of new products.

Specifically, the assembled component further includes a connecting member for connecting a fixed member and/or a connecting member to a fixed member and/or a connecting member.

By assembling a connecting member together with the assembled component, a connecting member of an appropriate size may be conveniently found by a user. So we can connect the moving member and/or the fixed member. A common connecting member is not needed. Taking lapping a robot as example, if a common bolt or screw is selected, the size may be too large. Moreover, when in use, if there is interference to the movement of other parts, it is required to saw off the bolt or screw, so that the workload of lapping will be greatly increased. The usability of the assembled component is reduced. Therefore, the fixed member and the moving member are mated with connecting members of a special size. Thus, we can ensure that a user may conveniently connect the fixed member and the moving member without selecting and processing existing connecting members.

The driving mechanism shown in FIG. 19 includes a power component 703. The power component 703 is mounted on a multi-hole bent plate 400. An output shaft of the power component 703 is connected to a multi-hole circular plate 201. A bar member 102 is mounted on the multi-hole circular plate 201. An action may be output through connecting holes A at two ends of 102.

Embodiment 3

A robot is provided with the assembled component.

Figure 20:
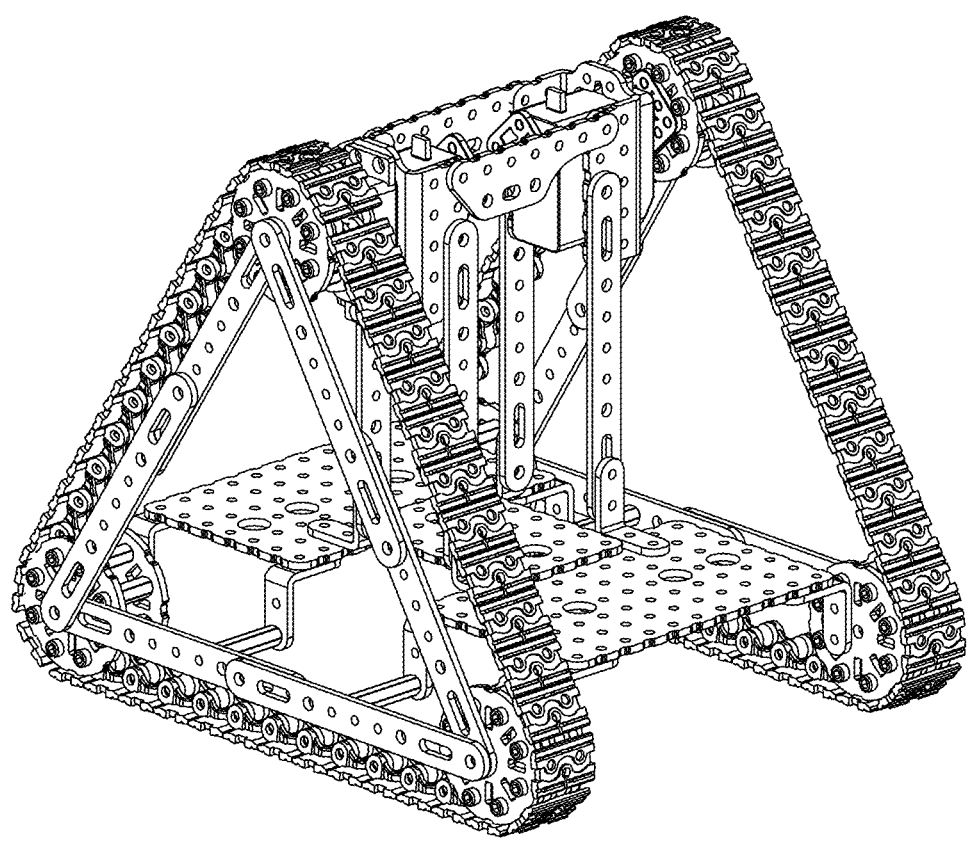
FIG. 20 is a structural diagram of a crawler-type walking robot according to Embodiment 3.

FIG. 20 is a structural diagram of a crawler-type walking robot in Embodiment 3. In the robot, a single-sided triangle frame is formed by a bar member. A platform for containing an article to be transported is formed by a multi-hole plate member. A bent member and a mounting platform of a driving motor are formed on the top by using a bent member.

By using the above-described bar member to form an assembled component and matching with a fixed member having the same thickness, the size is even. Moreover, it is convenient to construct robots, teaching aids or movement mechanisms in various forms to research or verify the feasibility of movement mechanisms. By enlarging models assembled by the assembled component in scale to different degrees, specific movement mechanisms may be formed. When these movement mechanisms are applied in production practices, it is advantageous to shorten the development cycle and quicken the development progress of new products.

Embodiment 4

The difference between this embodiment and Embodiment 1 lies in that the bar member in Embodiment 1 is a straight bar member while the bar member in this embodiment is a bent bar member.

Figure 21:
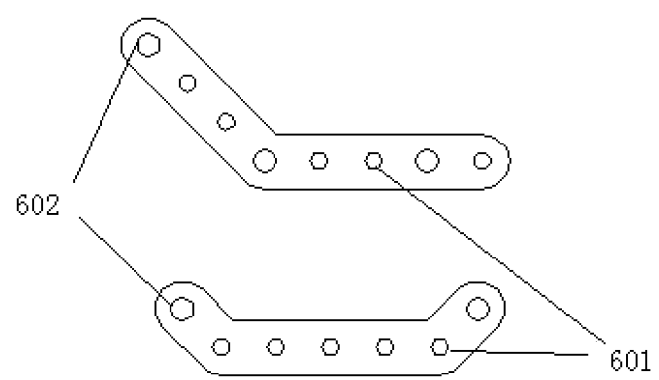
FIG. 21 is a top view of each bent bar member in Embodiment 4.
Figure 22:
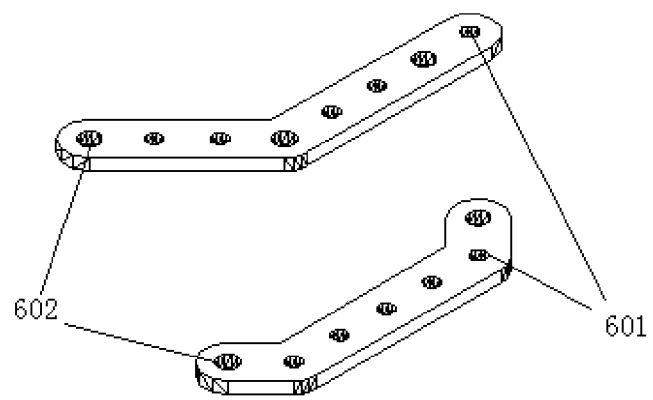
FIG. 22 is a stereoscopic diagram of each bent bat member in Embodiment 4.
Figure 23:
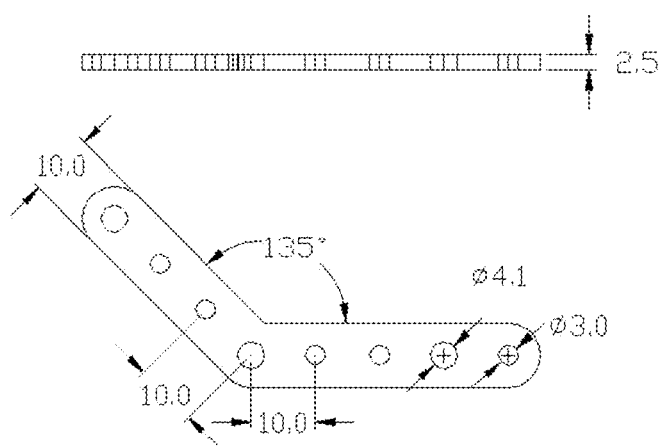
FIG. 23 is a dimensional diagram of a bent bar member in Embodiment 4.

As shown in FIGS. 21-23, a bent portion, which is bent in a plane vertical to the thickness direction of the bent bar member, is provided in the middle or at two ends of the bent bar member.

Figure 24:
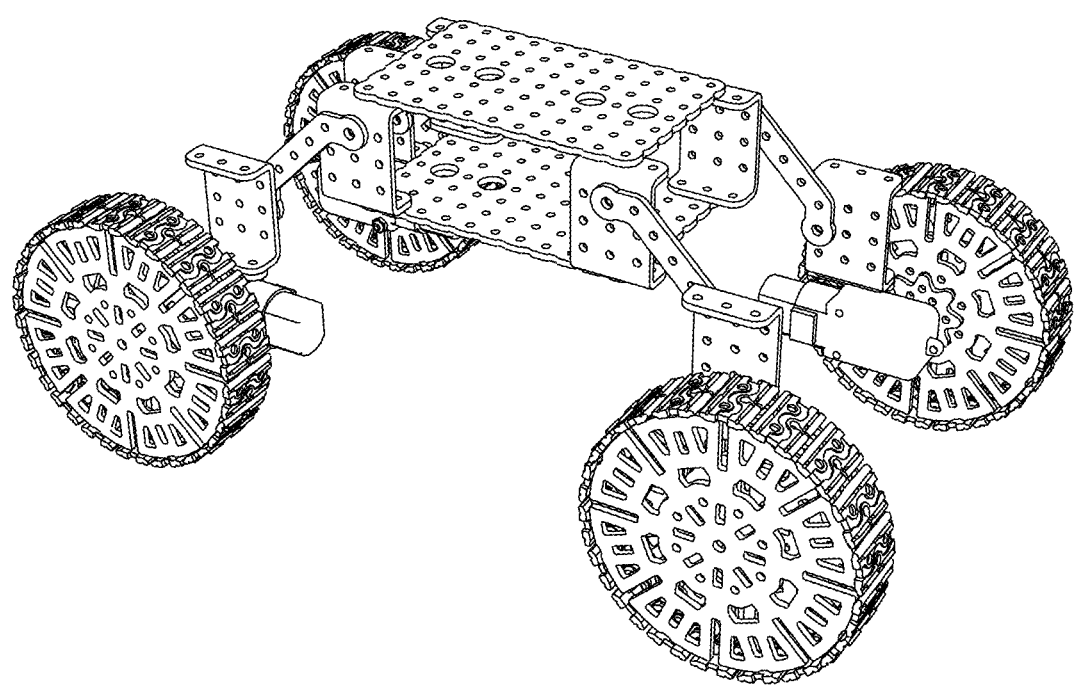
FIG. 24 is a stereoscopic diagram of a model formed by a bent member which is bent at two ends.

By bending the middle of the bent bar member in a length direction thereof, the coverage range of the bar member may be expanded. A bar having a certain bevel is constructed without lapping three straight bar members into a triangle. It is greatly convenient to construct a mechanism. For example, FIG. 24 shows a vehicle formed by using a bent member which is bent at two ends. In the vehicle, a hole distance on a component forming a vehicle body is the same as that of the bar member for connecting wheels. Therefore, in a direction of 45° by a part of the vehicle body, the hole distance is (square root of 2) times of that of the bar member. As the hole distance is not an integer, the connection of the wheels with the vehicle body cannot be realized by one straight bar member. Even if such connection is realized by combining a plurality of straight bar members, the connection having an angle of 45° also cannot be realized. Therefore, such connection having an angle of 45° may be directly realized by using one bent bar member having an angle of 135° at two ends.

After the two ends of the bent bar member are bent, it can be avoided that there will be interference between a connected part or connecting member and straight bar members because holes close to the ends are connected to other parts when two straight bar members are hinged at ends. The result is that the included angle between the two straight bar members cannot be rotated to a very small angle. However, after the bent bar member bent at ends is employed, a part or connecting member connected to the middle of two bent bar members has no direct influence on rotating the angle between the two bent bar members to a very small angle because the ends are bent. The improved result is that the two bent members may be rotated to a smaller included angle. The rotation range of the relative included angle between two bar members is expanded.

Figure 25:
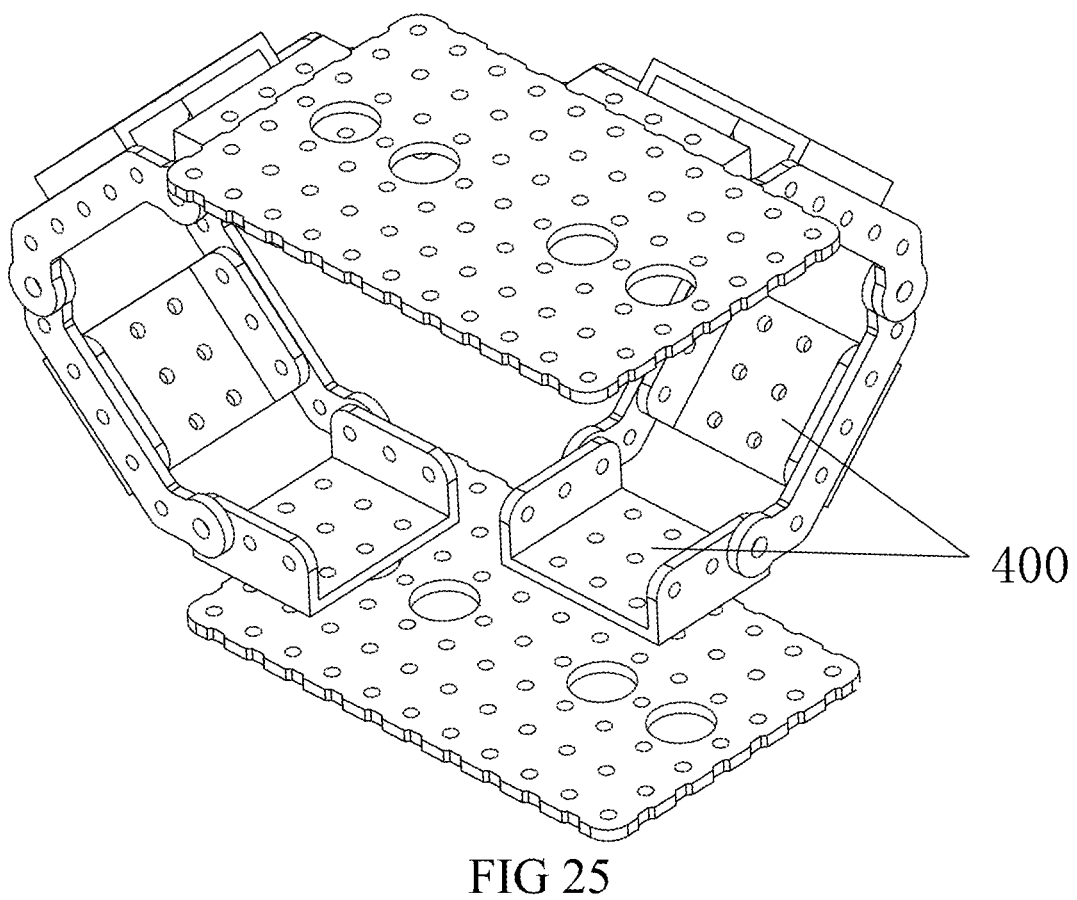
FIG. 25 is a stereoscopic diagram of a linear telescoping mechanism.

For example, as shown in FIG. 25, this diagram shows a linear telescoping mechanism. The telescoping of the linear telescoping mechanism is realized by a hinge mechanism of two bars arranged in a plurality of planes. In this mechanism, as the bar members telescoping in one direction are a pair of bar members and the distance between the two bar members is large, we further need a bent plate member 400 between the two bar members to improve the rigidity. However, if one bent plate member 400 is further provided on one straight bar member, two bent plate members 400 will be interfered with each other during folding. The angle of folding will be limited. The telescoping range of the telescoping mechanism is thus limited. Therefore, by using a bent bar member which is bent by 135° at two ends, two bent bar members 400 will not be interfered with each other. The telescoping range of the telescoping mechanism is improved.

More specifically, the angle of bending of the bent portion is 135°. The presentation of the angle may refer to FIG. 23.

When the bent bar member which is bent at the ends, the angle of bending is set at 135°. Thus, parts connected at the ends may be allowed to have a larger relative movement range while two parts connected to the connecting holes at the ends have a larger angle movement range. The parts connected at the ends will have no apparent movement interference with parts connected at the second holes from the ends. When the bent bar member which is bent in the middle, it is also possible to have some movement interference between a part connected at the connecting hole of the bent portion and a part connected on one side of the bent portion.

There are the connecting holes B and/or the connecting holes C arranged between two of the connecting holes A.

By providing connecting holes A 602 having a larger aperture on both sides of the connecting holes B and the connecting holes C 604, the connecting holes A 602 may be allowed to be close to the ends of a connecting bar as far as possible. Thus, we can connect other connecting bars by making the most of the length of the connecting bar. It is advantageous to expand the movement range.

Figure 26:
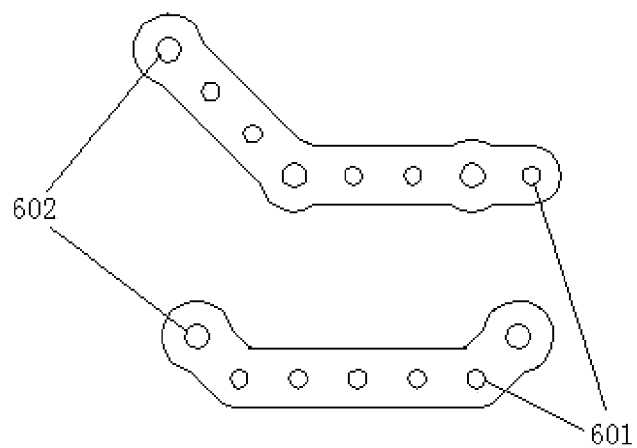
FIG. 26 is a structural diagram of a bent member having a flange provided a sidewall thereof.

On the bent bar member, an outer flange is protruded from a sidewall of the bar member on an outside of the connecting holes A 602. The thickness of the outer flange is the same as that of the bar member. A distance from an outside edge of the outer flange to the edges of the connecting holes A 602 is a distance from the sidewall of the bar member to the edges of the connecting holes B 601. The specific structure is as shown in FIG. 26.

By enlarging the edge of the bar member at a position outside the larger connecting holes A 602, it is advantageous to ensure the material width of the bar member besides the connecting holes A 602. This improves the rigidity and intensity of the bar member. Meanwhile, when the bar member is formed by stamping, it is also advantageous to improve the manufacturability of processing.

Embodiment 5

Figure 27:
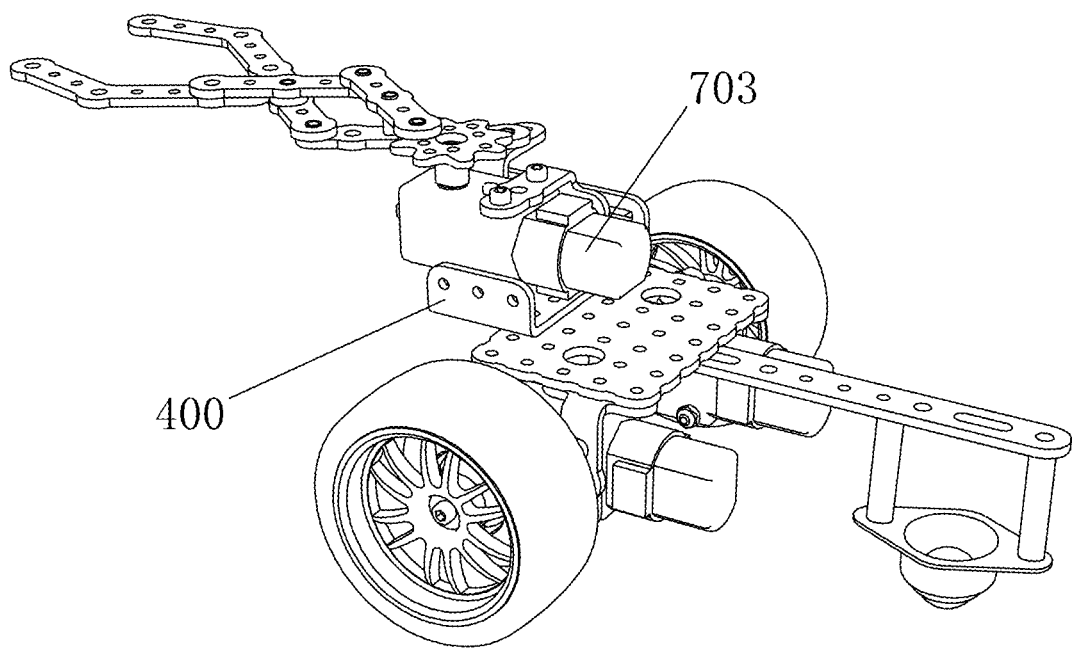
FIG. 27 is a structural diagram of a clamping mechanism assembled by an assembled component.

FIG. 27 is a structural diagram of a driving mechanism assembled by using an assembled component.

An assembled component is provided, including a moving member and a fixed member, the moving member includes at least one of a multi-hole bar member and a multi-hole circular plate. The multi-hole bar member is the bar member in the embodiments described above. The multi-hole circular plate has a central hole and a plurality of fixed holes that are distributed around the central hole and arranged circumferentially. The fixed member includes a multi-hole plate and a multi-hole bent plate. The thickness of the multi-hole plate is the same as that of the multi-hole bar member. A plurality of fixed holes are arranged in a matrix provided on the multi-hole plate. A bent portion is formed by bending at least one end of the multi-hole bent plate and a plurality of fixed holes which are distributed on the multi-hole bent plate in a matrix.

By using the above-described bar member to form an assembled component and matching with a fixed member having the same thickness, the size is even. Moreover, it is convenient to construct robots, teaching aids or movement mechanisms in various forms to research or verify the feasibility of movement mechanisms. By enlarging models assembled by the assembled component in scale to different degrees, specific movement mechanisms may be formed. When these movement mechanisms are applied in production practices, it is advantageous to shorten the development cycle and quicken the development progress of new products.

Specifically, the assembled component further includes a connecting member for connecting a fixed member and/or a connecting member to a fixed member and/or a connecting member.

By assembling a connecting member together with the assembled component, a connecting member of an appropriate size may be conveniently found by a user, so as to connect the moving member and/or the fixed member, so that a common connecting member is not needed. Taking lapping a robot as example, for example, if a common bolt or screw is selected, the size may be too large. Moreover, when in use, if there is interference to the movement of other parts, it is required to saw off the bolt or screw. The workload of lapping will be greatly increased, and the usability of the assembled component is reduced. Therefore, the fixed member and the moving member are mated with connecting members of a special size. Thus, we can ensure that a user may conveniently connect the fixed member and the moving member without selecting and processing existing connecting members.

The clamping mechanism shown in FIG. 27 includes a power component 703, which is mounted on a bent plate member 400. The power component 703 drives a parallelogram mechanism. Two bent bar members which are bent by 135° in the middle thereof are provided on an output shaft of the parallelogram mechanism. If two straight bar members are used for outputting, the outer ends of the straight bar members apparently cannot realize a clamping function.

Embodiment 6

A robot is provided with the assembled component.

Figure 28:
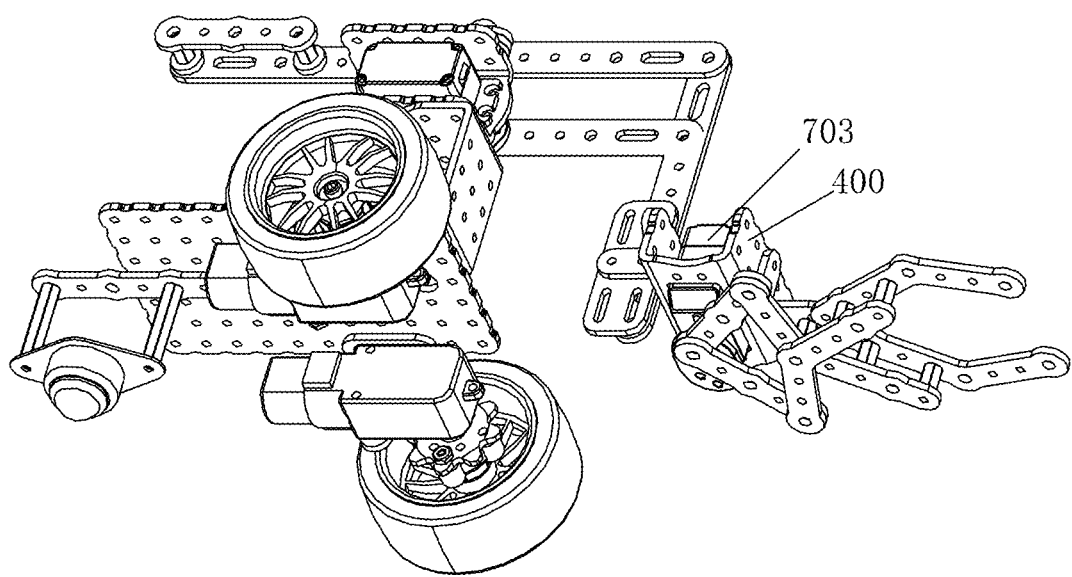
FIG. 28 is a structural diagram of a clamping robot according to Embodiment 3.

FIG. 28 is a structural diagram of a clamping robot in Embodiment 6.

In the shown robot, a single-sided triangle frame is formed by a bar member, a platform for containing an article to be transported is formed by a multi-hole plate member and a bent member, and a mounting platform of a driving motor is formed on the top by using a bent member.

By using the above-described bar member to form an assembled component and matching with a fixed member having the same thickness, the size is even. It is convenient to construct robots, teaching aids or movement mechanisms in various forms to research or verify the feasibility of movement mechanisms. By enlarging models assembled by the assembled component in scale to different degrees, specific movement mechanisms may be formed. When these movement mechanisms are applied in production practices, it is advantageous to shorten the development cycle and quicken the development progress of new products.

The front portion of the clamping mechanism shown in FIG. 28 includes a power component 700, which is mounted on a bent plate member 400. The power component 700 drives a parallelogram mechanism, and two bent bar members which are bent by 135° in the middle thereof are provided on an output shaft of the parallelogram mechanism. If two straight bar members are used for outputting, the outer ends of the straight bar members apparently cannot realize a clamping function.

Although the preferred embodiments of the present invention have been described above with reference to the accompanying drawings, the present invention is not limited thereto. The above specific implementations are merely illustrative but not limiting. A person of ordinary skill in the art may make various forms under the teaching of the present invention without departing from the idea of the present invention and the protection scope of the appended claims. These forms shall fall into the protection scope of the present invention.

What is claimed is:

1. A robot, comprising an assembled component, wherein:
the assembled component includes a fixed member and a moving member;
the moving member includes a multi-hole bar member and a multi-hole circular plate;
the multi-hole bar member has a width four times longer than its thickness;
the multi-hole bar member comprises a set of connecting holes running through the multi-hole bar member along a thickness direction of the multi-hole bar member;
the multi-hole circular plate has a central hole and a plurality of fixed holes distributed around the central hole and arranged circumferentially;
the fixed member comprises a multi-hole plate and a multi-hole bent plate;
the thickness of the multi-hole plate is the same as the thickness of the multi-hole bar member;
a plurality of fixed holes is arranged in a matrix on the multi-hole plate;
a bent portion is formed by bending at least one end of the multi-hole bent plate; and
a plurality of fixed holes is distributed on the multi-hole bent plate in a matrix.

2. The robot in claim 1, wherein:
the set of connecting holes comprises a subset of connecting holes A and a subset of connecting holes B; and
the dimension of the subset of connecting holes A is greater than the dimension of the subset of connecting holes B.

3. The robot in claim 2, wherein:
a distance between the centers of adjacent connecting holes A is four times longer than the thickness of the bar member;
a distance between the centers of adjacent connecting holes B is four times longer than the thickness of the bar member; and
a distance between the center of a connecting hole A and the center of an adjacent connecting hole B is four times longer than the thickness of the bar member.

4. The robot in claim 2, wherein:
the bar member is a bent bar member, which includes a bent portion in the middle of the bent bar member or at both ends of the bent bar member; and
the bent portion is bent within a plane vertical to the thickness direction of the bent bar member.

5. The robot in claim 4, wherein the angle defined by the bent portion is 135°.

6. The robot in claim 2, wherein:
the set of connecting holes further comprises a subset of connecting holes C;
an edge of the connecting holes C includes an enclosed shape defined by successively and sequentially connecting a first line segment, a first semicircular arc, a second line segment and a second semicircular arc;
the length of the first line segment is four times longer than the thickness of the bar member;
the length of the second line segment is four times longer than the thickness of the bar member;
the first semicircular arc opens towards the middle of the connecting hole C;
the second semicircular arc opens towards the middle of the connecting hole C;
the radius of the first semicircular arc is equal to one of the radius of the connecting hole A and the radius of the connecting hole B; and
the radius of the second semicircular arc is equal to one of the radius of the connecting hole A and the radius of the connecting hole B.

7. The robot in claim 6, wherein a connecting hole B, a connecting hole C or both are arranged between a pair of connecting holes A.

8. The robot in claim 2, wherein:
an outer flange is protruded from a sidewall of the bar member on an outside of the set of connecting holes A;
the thickness of the outer flange is the same as the thickness of the bar member; and
a distance from an outside edge of the outer flange to the edge of the connecting hole A is the same as a distance from the sidewall of the bar member to the edge of the connecting hole B.

* * * * *